Nov. 29, 1938.   P. CLANCY   2,138,802
SELECTOR DEVICE FOR VALVE MANIFOLDS
Filed March 14, 1938
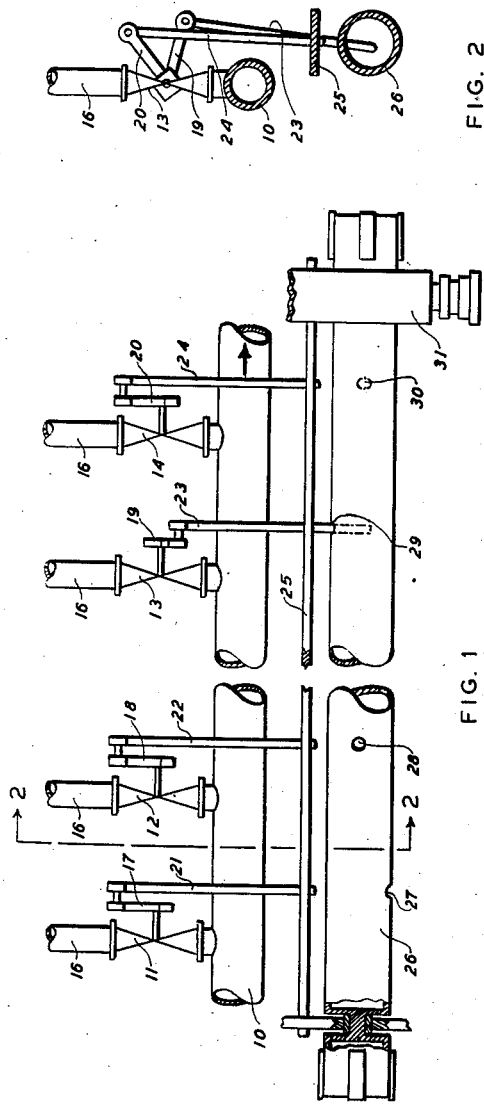
PETER CLANCY
*INVENTOR*
*ATTORNEY*

Patented Nov. 29, 1938

2,138,802

UNITED STATES PATENT OFFICE 2,138,802

SELECTOR DEVICE FOR VALVE MANIFOLDS

Peter Clancy, Oakland, Calif.

Application March 14, 1938, Serial No. 195,729

1 Claim. (Cl. 137—21)

The object of the invention is to provide a device for permitting any one valve of a series or manifold to be opened while preventing the opening of more than one valve at a time.

The device applies particularly to the valve manifolds of multi-compartment tank trucks, in which it is customary to place different commodities in the various compartments. By the use of this device the contamination of one product with another is avoided and a single meter may be used for all the compartments. It is also applicable, with slight modification, to any other manifold using stopcocks or rising stem valves.

The device of the invention may best be described with reference to the attached drawing, in which—

Fig. 1 represents the entire device in longitudinal elevation;

Fig. 2 is a cross-section and partial elevation on the line 2—2 of Fig. 1, and

Fig. 3 is an enlarged view, partially in section, of the right hand end of the selector proper.

Referring first to Figs. 1, and 2, 10 is a single discharge manifold communicating with a series of stopcocks 11—12—13—14 represented diagrammatically. These cocks communicate with various sources of supply, as for example the compartments of a tank truck, through pipes 16—16.

Each of the socks is provided with an extension handle 17, 18, 19, or 20, by which the plugs are turned from the closed to the open position and vice versa, and from the end of each handle is pivotally suspended a rod 21, 22, 23 or 24. These rods pass through holes of corresponding size in a guide member 25 which is held in any convenient manner in a fixed position as regards pipe 10.

A cylindrical member 26, which may be of light weight pipe or sheet metal, is suspended from guide member 25 in such manner that it may readily be rotated by hand. This cylinder is provided with holes 27—28—29—30 of sufficient size to admit the ends of rods 21—24, the holes being so located longitudinally that one of them is aligned with each rod, and being staggered around the circumference so that when one hole is aligned to admit the end of the rod, a blank portion of the cylinder is presented to each of the other rods. In this manner, when hole 29 beneath cock 13, for example, is brought to loop upwardly by turning the cylinder, the handle 19 may be turned to open cock 13, rod 23 passing into the hole, while no other handle may be turned for lack of any registering opening to admit the corresponding rod.

It is convenient, though not strictly essential, to add the device generally indicated at 31 in Fig. 1 and shown in more detail in Fig. 3. This device for radial registration of the holes 27—30 with their respective rods consists of a circumferential series of indentations 32—32 which are entered in turn by a ball 33 urged inwardly by a light spring 34. It is also convenient to place opposite each of these indentations a name plate 35 inscribed with the name of the commodity which may be withdrawn when each particular plate faces the operator or other symbol identifying the pipe 16 which may then be placed in communication with manifold pipe 10.

In the use of this device on a series of gate valves having rising stems, the guide 25 may be omitted and the holes 27, etc. in cylinder 26 arranged to receive the valve stem, or a projection therefrom.

I claim as my invention:

In combination with a longitudinally arranged series of valves each provided with a member which moves longitudinally as the valve is opened: a manually rotatable cylinder having openings staggered around its circumference, said cylinder being arranged in juxtaposition to the ends of said longitudinally movable members when the valves are closed, and said openings being so arranged that one only of said openings may be brought into register with one of said longitudinally movable members at one time, to permit the passage of said longitudinally movable member and the opening of said valve.

PETER CLANCY.